United States Patent
Muto et al.

(10) Patent No.: US 9,840,601 B2
(45) Date of Patent: Dec. 12, 2017

(54) METHOD FOR PRODUCING A CURED PRODUCT

(71) Applicant: Shin-Etsu Chemical Co., Ltd., Chiyoda-ku, Tokyo (JP)

(72) Inventors: Mitsuo Muto, Annaka (JP); Kenichi Fukuda, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/416,509

(22) Filed: Jan. 26, 2017

(65) Prior Publication Data

US 2017/0137583 A1    May 18, 2017

Related U.S. Application Data

(62) Division of application No. 15/014,201, filed on Feb. 3, 2016, now abandoned.

(30) Foreign Application Priority Data

Feb. 4, 2015 (JP) .................................. 2015-020416

(51) Int. Cl.
| | |
|---|---|
| C08F 2/50 | (2006.01) |
| C08F 2/46 | (2006.01) |
| C08G 61/04 | (2006.01) |
| C08J 3/28 | (2006.01) |
| C08G 65/336 | (2006.01) |
| C08G 77/46 | (2006.01) |
| C08K 3/36 | (2006.01) |

(52) U.S. Cl.
CPC ............. *C08J 3/28* (2013.01); *C08G 65/336* (2013.01); *C08G 77/46* (2013.01); *C08K 3/36* (2013.01); *C08G 2650/48* (2013.01); *C08J 2371/00* (2013.01)

(58) Field of Classification Search
CPC ......... C08J 3/28; C08J 2371/00; C08G 77/46; C08G 2650/48; C08G 65/336; C08K 3/36
USPC ................. 522/66, 6, 71, 189, 184, 1; 520/1
See application file for complete search history.

(56) References Cited

U.S. PATENT DOCUMENTS

| | | | |
|---|---|---|---|
| 5,919,886 A | 7/1999 | Matsuda et al. | |
| 6,020,450 A | 2/2000 | Matsuda et al. | |
| 6,451,869 B1 | 9/2002 | Butts | |
| 6,517,946 B2 | 2/2003 | Shiono | |
| 7,851,066 B2 | 12/2010 | Yamaguchi | |
| 2001/0008916 A1* | 7/2001 | Sato | C08G 65/007 524/448 |
| 2002/0019483 A1 | 2/2002 | Sato et al. | |
| 2003/0225200 A1 | 12/2003 | Sato | |
| 2004/0229992 A1* | 11/2004 | Sato | C08K 3/36 524/493 |
| 2005/0090602 A1 | 4/2005 | Koshikawa | |
| 2005/0277731 A1* | 12/2005 | Fukuda | C08K 5/5406 524/588 |
| 2006/0160934 A1 | 7/2006 | Koshikawa | |
| 2006/0270791 A1 | 11/2006 | Kishita | |
| 2007/0191554 A1 | 8/2007 | Yamaguchi | |
| 2008/0293859 A1 | 11/2008 | Yamaguchi | |
| 2009/0258986 A1 | 10/2009 | Yamaguchi | |
| 2010/0292361 A1 | 11/2010 | Koellnberger | |
| 2011/0003906 A1 | 1/2011 | Angermaier et al. | |
| 2011/0060109 A1 | 3/2011 | Muto et al. | |
| 2011/0178263 A1* | 7/2011 | Koshikawa | C08G 65/007 528/15 |
| 2014/0191445 A1* | 7/2014 | Rist | B29C 35/0805 264/496 |

FOREIGN PATENT DOCUMENTS

| | | |
|---|---|---|
| EP | 1 033 387 A2 | 9/2000 |
| EP | 1614718 A1 | 1/2006 |
| EP | 2725064 A2 | 4/2014 |
| JP | 2001-192546 A | 7/2001 |
| JP | 3183624 B2 | 7/2001 |
| JP | 3232221 B2 | 11/2001 |
| JP | 3350347 B2 | 11/2002 |
| JP | 3617568 B2 | 2/2005 |
| JP | 3646775 B2 | 5/2005 |
| JP | 4016239 B2 | 12/2007 |
| JP | 5146690 B2 | 2/2013 |
| JP | 5342830 B2 | 11/2013 |
| JP | 5384524 B2 | 1/2014 |
| WO | WO 2011/011654 A2 | 1/2011 |

OTHER PUBLICATIONS

Extended European Search Report dated Jun. 15, 2016, for European Application No. 16154109.9.

* cited by examiner

*Primary Examiner* — Jessica Whiteley

(74) *Attorney, Agent, or Firm* — Birch, Stewart, Kolasch & Birch, LLP

(57) ABSTRACT

A photo-curable composition having superior curability at room temperature and storage stability, and also offer a rubber-like cured product thereof having a good profile of properties including heat resistance, low-temperature performance, chemical resistance, solvent resistance and oil resistance. Specifically, A photo-curable composition which includes (A) 100 parts by mass of a linear polyfluoro compound having at least two alkenyl groups in a molecule and a linear perfluoropolyether structure in a backbone of the molecule, (B) a fluorine-containing organohydrogenpolysiloxane having at least two hydrogens bonded to a silicon atom in a molecule, and (C) 0.1 to 500 ppm of a photoactive hydrosililation catalyst relative to the mass of component (A) in terms of metal atom, wherein an amount of component (B) is 0.5 to 3.0 mol of Si—H groups in component (B) relative to 1.0 mol of alkenyl groups in component (A).

8 Claims, No Drawings

METHOD FOR PRODUCING A CURED PRODUCT

CROSS-REFERENCE TO RELATED APPLICATIONS

This is a Divisional of co-pending application Ser. No. 15/041,201, filed on Feb. 3, 2016. Priority under 35 U.S.C. §119(a) is claimed through Ser. No. 15/041,201 to Application JP 2015-020416, filed in Japan on Feb. 4, 2015. The entire contents of both prior applications are hereby incorporated by reference.

BACKGROUND OF THE INVENTION

Field of the Invention

The present invention relates to a photo-curable, especially ultraviolet-light-curable fluoropolyether-based rubber composition, a curing method thereof and a cured product obtained by the curing method.

Background of the Prior Art

Heat-curable fluoropolyether-based rubber compositions have excellent properties in terms of heat resistance, low-temperature performance, chemical resistance, solvent resistance and oil resistance. For this reason, heat-curable fluoropolyether-based rubber compositions are used in a wide variety of applications, typically in the automotive industry (Patent documents 1, 2, and 3). However, heat is necessary for this type of compositions to cure themselves, there arise problems such as: a relatively large space for a heating oven is required; it is difficult to apply the compositions to heat-sensitive parts or to large-size parts which are too large to place in a heating oven; and productivity decreases because a casting process of the composition requires batch type.

In contrast, room temperature (RT) curable fluoropolyether-based rubber compositions have been invented such as compositions of condensation cure type or amide-cross-linked type. These compositions not only dispense with heat in forming cured products but also the cured products have good properties including heat resistance, low-temperature performance, chemical resistance, solvent resistance and oil resistance as disclosed in Patent documents 4 to 8. These compositions are expected to have a variety of applications. However, such RT curable fluoropolyether-based rubber compositions have problems of balancing storage stability and fast curability, such as a problem of increased viscosity with the lapse of time during storage or a problem of taking 24 hours or more for the composition to cure themselves.

Also, in the field of silicone elastomer material, patent documents 9 and 10 disclose photo-curable compositions having good storage stability without any exposure of light and superior curability when exposed to light by using a photoactive hydrosilylation catalyst which activates a catalyst through an irradiation of UV light in the range from 230 to 400 nm. However, the photo-curable compositions have problems of having insufficient chemical resistance, solvent resistance and oil resistance depending on the usage thereof.

DOCUMENTS OF RELATED ART

Patent Documents

[Patent document 1] Japanese Unexamined Patent Application Publication No. 2001-192546
[Patent document 2] Japanese Patent No. 3646775
[Patent document 3] Japanese Patent No. 4016239
[Patent document 4] Japanese Patent No. 3232221
[Patent document 5] Japanese Patent No. 3183624
[Patent document 6] Japanese Patent No. 3350347
[Patent document 7] Japanese Patent No. 3617568
[Patent document 8] Japanese Patent No. 5146690
[Patent document 9] Japanese Patent No. 5384524
[Patent document 10] Japanese Patent No. 5342830

SUMMARY OF THE INVENTION

It is an object of the invention to provide a photo-curable composition having superior curability at room temperature and storage stability, a curing method thereof and a cured product obtained by the curing method, and to provide a photo-curable composition providing a rubber-like cured product having a good profile of properties including heat resistance, low-temperature performance, chemical resistance, solvent resistance and oil resistance.

The inventors found that the aforementioned object of the invention could be achieved through providing a photo-curable fluoropolyether-based rubber composition comprising proper amounts of:

(A) a linear polyfluoro compound having at least two alkenyl groups per molecule and a linear perfluoropolyether structure in its backbone;

(B) a fluorine-containing organohydrogenpolysiloxane containing at least two hydrogen atoms bonded to a silicon atom in a molecule; and (C) a photoactive hydrosilylation catalyst.

In this way, the inventors completed the present invention. That is, the present invention provides the following photo-curable fluoropolyether-based rubber composition, cured product thereof, and a curing method thereof.

Moreover, a linear polyfluoro compound, a linear perfluoropolyether structure or a linear perfluoropolyether group in the present invention refers to a structure where a repeating unit of divalent fluorooxyalkylene is linearly linked to each other which makes up the linear perfluoropolyether structure as a backbone. Each divalent fluorooxyalkylene unit itself may be a linear fluorooxyalkylene unit or a fluorooxyalkylene unit having a branched structure such as —[$CF_2CF(CF_3)O$]—.

<1> A photo-curable fluoropolyether-based rubber composition comprising:

(A) 100 parts by mass of a linear polyfluoro compound having:
    at least two alkenyl groups per molecule; and
    a linear perfluoropolyether structure in a backbone of the molecule, (B) a fluorine-containing organohydrogenpolysiloxane having at least two hydrogens bonded to a silicon atom per molecule, said fluorine-containing organohydrogenpolysiloxane containing 0.5 to 3.0 mol of Si—H groups based on 1.0 mol of alkenyl groups in component (A) and (C) 0.1 to 500 ppm of a photoactive hydrosililation catalyst based on the mass of component (A) in terms of metal atom.

Here, the composition of the present invention according to <1> preferably does not include any linear polyfluoro compound containing only one alkenyl group in one molecule and having a perfluoropolyether structure in its backbone.

<2> The photo-curable fluoropolyether-based rubber composition according to <1>, wherein component (A) is a linear polyfluoro compound represented by a formula (1):

[Chemical Formula 1]

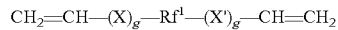

$$CH_2=CH-(X)_g-Rf^1-(X')_g-CH=CH_2 \quad (1)$$

wherein X represents —CH$_2$—, —CH$_2$O—, —CH$_2$OCH$_2$—, or —Y—NR$^1$—CO—, wherein Y represents —CH$_2$—, —Si(CH$_3$)$_2$CH$_2$CH$_2$CH$_2$—, —Si(CH$_3$)(CH═CH$_2$)CH$_2$CH$_2$CH$_2$—, —Si(CH═CH$_2$)$_2$CH$_2$CH$_2$CH$_2$—, or an o-, m-, or p-silylphenylene group represented by a structural formula (Z) shown below,

[Chemical formula 2]

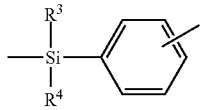

(Z)

wherein each of R$^3$ and R$^4$ independently represents —CH$_3$ or —CH═CH$_2$, and R$^1$ represents a hydrogen atom or a substituted or unsubstituted monovalent hydrocarbon group, X' represents —CH$_2$—, —OCH$_2$—, —CH$_2$OCH$_2$—, or —CO—NR$^2$—Y'—, wherein Y' represents —CH$_2$—, —CH$_2$CH$_2$CH$_2$Si(CH$_3$)$_2$—, —CH$_2$CH$_2$CH$_2$Si(CH$_3$)(CH═CH$_2$)—, —CH$_2$CH$_2$CH$_2$Si(CH═CH$_2$)$_2$—, or an o-, m-, or p-silylphenylene group represented by a structural formula (Z') shown below

[Chemical Formula 3]

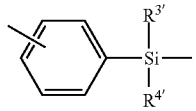

(Z')

wherein each of R$^{3'}$ and R$^{4'}$ independently represents —CH$_3$ or —CH═CH$_2$, and R$^2$ represents a hydrogen atom or a substituted or unsubstituted monovalent hydrocarbon group, g independently represents an integer of 0 or 1, and Rf$^1$ is a linear divalent perfluoropolyether group represented by a formula (i) or formula (ii) shown below, preferably a linear divalent perfluoropolyether group including —[CF$_2$CF(CF$_3$)O]— as a fluorooxyalkylene unit having a branched structure,

[Chemical Formula 4]

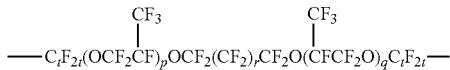

(i)

wherein each of p and q representing an integer of 0 to 150, provided that an average of the sum of p and q is from 2 to 200, r representing an integer of 0 to 6, and t representing an integer of 2 or 3,

[Chemical formula 5]

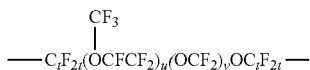

(ii)

wherein u representing an integer of 1 to 200, v representing an integer of 1 to 50, and t representing an integer of 2 or 3.

<3> The photo-curable fluoropolyether-based rubber composition according to <1>, wherein the fluorine-containing organohydrogenpolysiloxane of component (B) has at least one monovalent perfluoroalkyl group, monovalent perfluorooxyalkyl group, divalent perfluoroalkylene group, or divalent perfluorooxyalkylene group per molecule.

<4> The photo-curable fluoropolyether-based rubber composition according to <1>, wherein the photoactive hydrosililation catalyst of component (C) is (η$^5$-cyclopentadienyl)tri(σ-alkyl) platinum (IV) complex compound and/or β-diketonate platinum (II) complex compound.

<5> The photo-curable fluoropolyether-based rubber composition according to <1> further comprising (D) 0.5 to 30 parts by mass of hydrophobic silica powder having BET specific surface area of not less than 50 m$^2$/g based on 100 parts by mass of component (A), as a filler.

<6> The photo-curable fluoropolyether-based rubber composition according to <1> further comprising (E) a reaction control agents for hydrosilylation reaction.

<7> A cured product obtained from the photo-curable fluoropolyether-based rubber composition according to <1>.

<8> A curing method of a photo-curable fluoropolyether-based rubber composition comprising:
irradiating the photo-curable fluoropolyether-based rubber composition according to any one of <1> to <6> with near-ultraviolet radiation whose maximum peak is in the wavelength region from 300 nm to 400 nm.

The present invention can provide a photo-curable fluoropolyether-based rubber composition, a curing method thereof and a cured product obtained by the curing method, which exhibit excellent properties such as heat resistance, low-temperature performance, chemical resistance, solvent resistance and oil resistance. Also, the present invention can provide a photo-curable fluoropolyether-based rubber composition, curing method thereof and a cured product obtained by the curing method, which exhibit good storage stability and superior curability.

DETAILED DESCRIPTION OF THE INVENTION

The present invention is described below in detail. However, the present invention is not limited to the foregoing embodiments.

(A) Linear Polyfluoro Compound

Component (A) of the photo-curable fluoropolyether-based rubber composition of the present invention is a linear polyfluoro compound having at least two alkenyl groups in one molecule and a linear perfluoropolyether structure in its backbone. Here, the number of the alkenyl group is preferably from 2 to 30, and particularly preferably from 2 to 6. In addition, the composition of the present invention preferably does not include any linear polyfluoro compound containing only one alkenyl group in one molecule and having a linear perfluoropolyether structure in its backbone.

Moreover, a linear polyfluoro compound, a linear perfluoropolyether structure or a linear perfluoropolyether group in the present invention refers to a structure where a repeating unit of divalent fluorooxyalkylene is linearly linked to each other which makes up the linear perfluoropolyether structure as a backbone. Each divalent fluorooxyalkylene unit itself may be a linear fluorooxyalkylene unit or a fluorooxyalkylene unit having a branched structure such as —[CF$_2$CF(CF$_3$)O]—.

Preferably, component (A) is a compound represented by a general formula (1) shown below.

[Chemical formula 6]

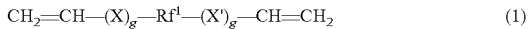
$$CH_2=CH-(X)_g-Rf^1-(X')_g-CH=CH_2 \quad (1)$$

In formula (1), X represents —$CH_2$—, —$CH_2O$—, —$CH_2OCH_2$—, or —Y—$NR^1$—CO— (wherein Y represents —$CH_2$—, —$Si(CH_3)_2CH_2CH_2CH_2$—, —$Si(CH_3)(CH=CH_2)CH_2CH_2CH_2$—, —$Si(CH=CH_2)_2CH_2CH_2CH_2$—, or an o-, m-, or p-silylphenylene group represented by a structural formula (Z) shown below,

[Chemical formula 7]

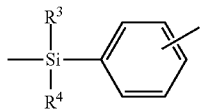

(Z)

and $R^1$ represents a hydrogen atom or a substituted or unsubstituted monovalent hydrocarbon group).

In formula (Z), each of $R^3$ and $R^4$ independently represents —$CH_3$ or —$CH=CH_2$.

Also, in formula (1), X' represents —$CH_2$—, —$OCH_2$—, —$CH_2OCH_2$—, or —CO—$NR^2$—Y'— (wherein Y' represents —$CH_2$—, —$CH_2CH_2CH_2Si(CH_3)_2$—, —$CH_2CH_2CH_2Si(CH_3)(CH=CH_2)$—, —$CH_2CH_2CH_2Si(CH=CH_2)_2$—, or an o-, m-, or p-silylphenylene group represented by a structural formula (Z') shown below,

[Chemical formula 8]

(Z')

and $R^2$ represents a hydrogen atom or a substituted or unsubstituted monovalent hydrocarbon group.)

In formula (Z'), each of $R^{3'}$ and $R^{4'}$ independently represents —$CH_3$ or —$CH=CH_2$.

Further, in formula (1), g independently represents an integer of 0 or 1, and $Rf^1$ is a linear divalent perfluoropolyether group represented by a formula (i) or formula (ii) shown below, preferably a linear divalent perfluoropolyether group including —[$CF_2CF(CF_3)O$]— as a fluorooxyalkylene unit having a branched structure.

[Chemical Formula 9]

(i)

In formula (i), each of p and q represents an integer of 0 to 150, preferably an integer of 1 to 150, provided that an average of the sum of p and q is from 2 to 200. r represents an integer of 0 to 6, and t represents an integer of 2 or 3.

[Chemical formula 10]

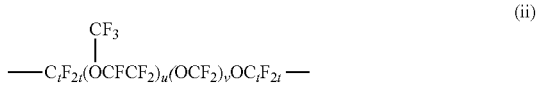

(ii)

In formula (ii), u represents an integer of 1 to 200, v represents an integer of 1 to 50, and t represents an integer of 2 or 3.

Examples of $R^1$ and $R^2$ include hydrogen atoms, and hydrocarbon groups having 1 to 12 carbon atoms, preferably 1 to 10 carbon atoms. Examples of the hydrocarbon groups include alkyl groups such as a methyl group, ethyl group, propyl group, butyl group, hexyl group, cyclohexyl group, and octyl group; aryl groups such as a phenyl group, and tolyl group; aralkyl groups such as a benzyl group and phenylethyl group; and monovalent hydrocarbon groups in which a portion of or all of the hydrogen atoms of the aforementioned groups are substituted with a halogen atom such as fluorine.

Here, $Rf^1$ in formula (1) is a linear divalent perfluoropolyether group, and preferably a group represented by the formula (i) or formula (ii) shown below.

[Chemical formula 11]

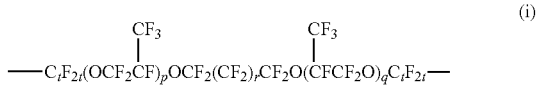

(i)

In formula (i), each of p and q represents an integer of 0 to 150, preferably an integer of 1 to 150, and more preferably an integer of 10 to 100, provided that an average of the sum of p and q is from 2 to 200, and preferably from 20 to 160. r represents an integer of 0 to 6, and preferably an integer of 0 to 4. t represents an integer of 2 or 3.

[Chemical formula 12]

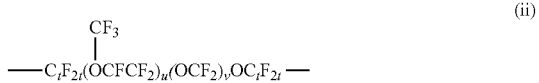

(ii)

In formula (ii), u represents an integer of 1 to 200, and preferably an integer of 20 to 160. v represents an integer of 1 to 50, and preferably an integer of 5 to 40. t represents an integer of 2 or 3.

Preferable examples of $Rf^1$ groups include the following three groups. Among these three groups, a divalent group having a structure represented by the first formula in the following formulas is particularly preferable.

[Chemical formula 13]

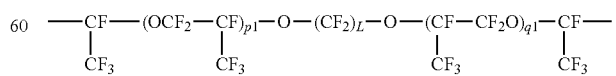

In the above formula, each of p1 and q1 represent an integer of 1 to 150, provided that an average of the sum of p1 and q1 is in the range from 2 to 200. L represents an integer of 2 to 6.

[Chemical formula 14]

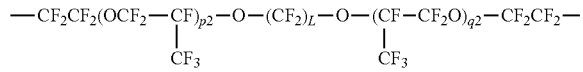

[Chemical formula 15]

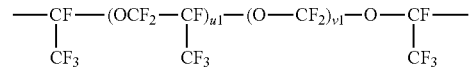

In the above formula, each of p2 and q2 represent an integer of 1 to 150, provided that an average of the sum of p2 and q2 is in the range from 2 to 200. L represents an integer of 2 to 6.

In the above formula, u1 represents an integer of 1 to 200, and v1 represents an integer of 1 to 50.

Preferable examples of component (A) include a compound represented by a formula (2) shown below.

[Chemical formula 16]

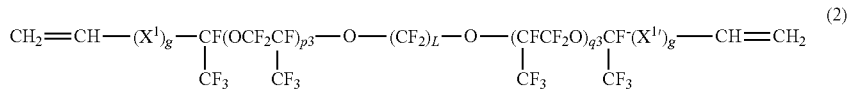
(2)

In formula (2), $X^1$ represents a group represented by $-CH_2-$, $-CH_2O-$, $-CH_2OCH_2-$, or $-Y-NR^{11}-CO-$ where Y is as defined above, $R^{11}$ represents a hydrogen atom, a methyl group, phenyl group or allyl group. $X^{1'}$ represents a group represented by $-CH_2-$, $-OCH_2-$, $-CH_2OCH_2-$, or $-CO-NR^{12}-Y'-$ where $R^{12}$ is the same definition as $R^{11}$, and Y' is as defined above. g independently represents an integer of 0 or 1. L represents an integer of 2 to 6. Each of p3 and q3 represent an integer of 1 to 150, provided that an average of the sum of p3 and q3 is in the range from 2 to 200.

Examples of a linear polyfluoro compound represented by the formula (1) include compounds represented by the formulas shown below.

[Chemical formula 17]

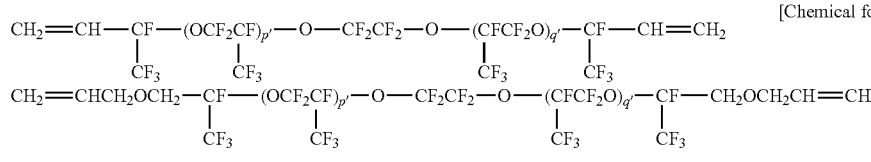

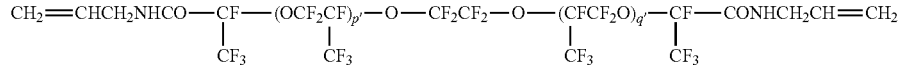

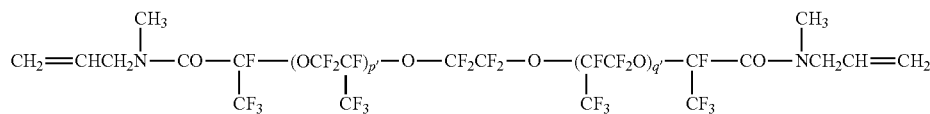

In the above formulas, each of p' and q' represent an integer of 1 to 150, provided that an average of the sum of p' and q' is in the range from 6 to 200.

[Chemical formula 18]

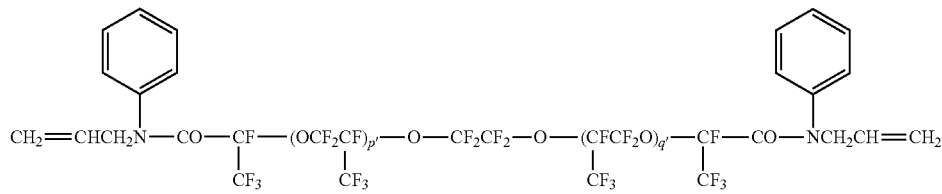

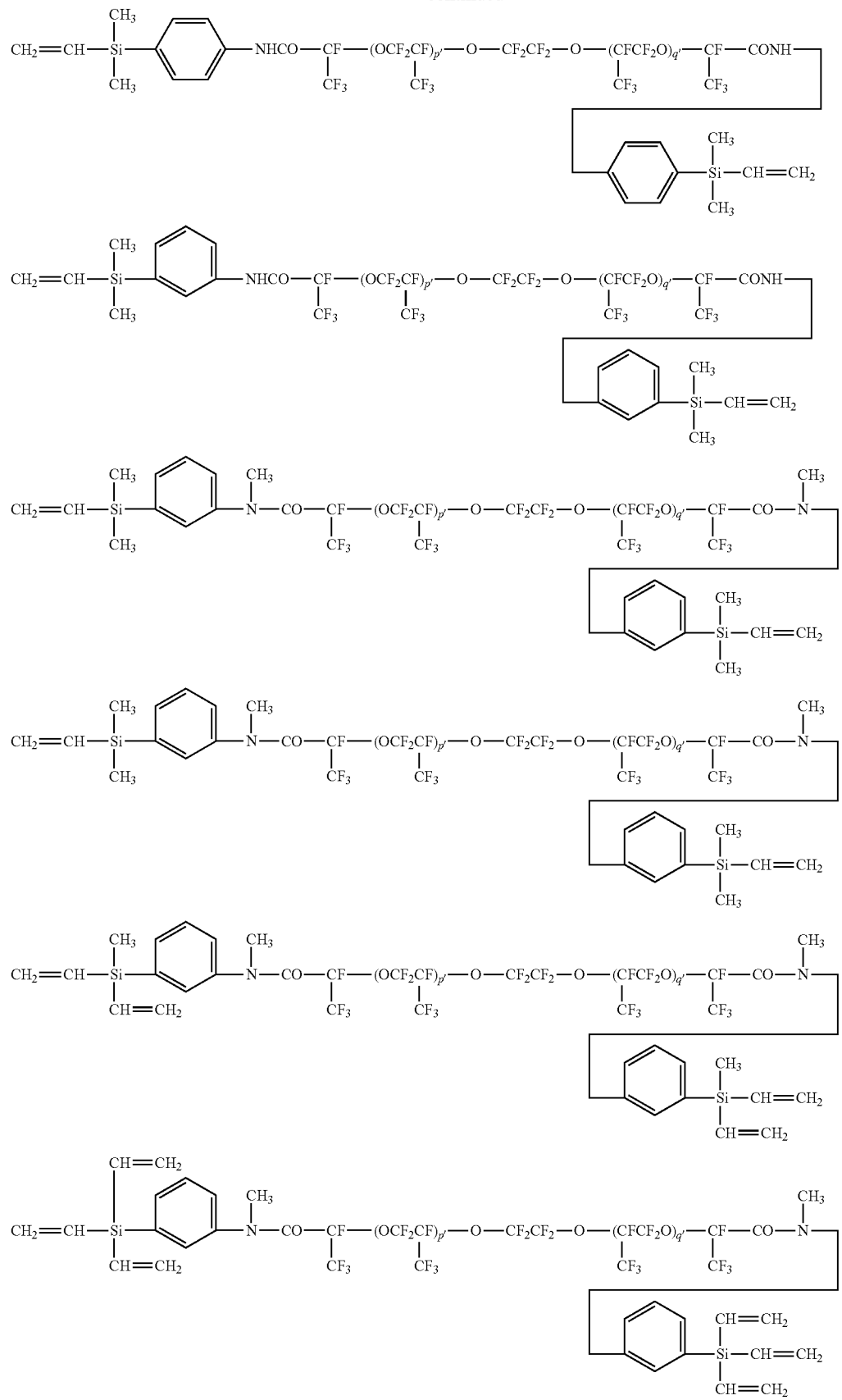

In the above formulas, each of p' and q' represent an integer of 1 to 150, provided that an average of the sum of p' and q' is in the range from 6 to 200.

linear polyfluoro compounds represented by formula (1) should be selected so that the selected compound has most appropriate viscosity depending on the purpose. In this case,

[Chemical formula 19]

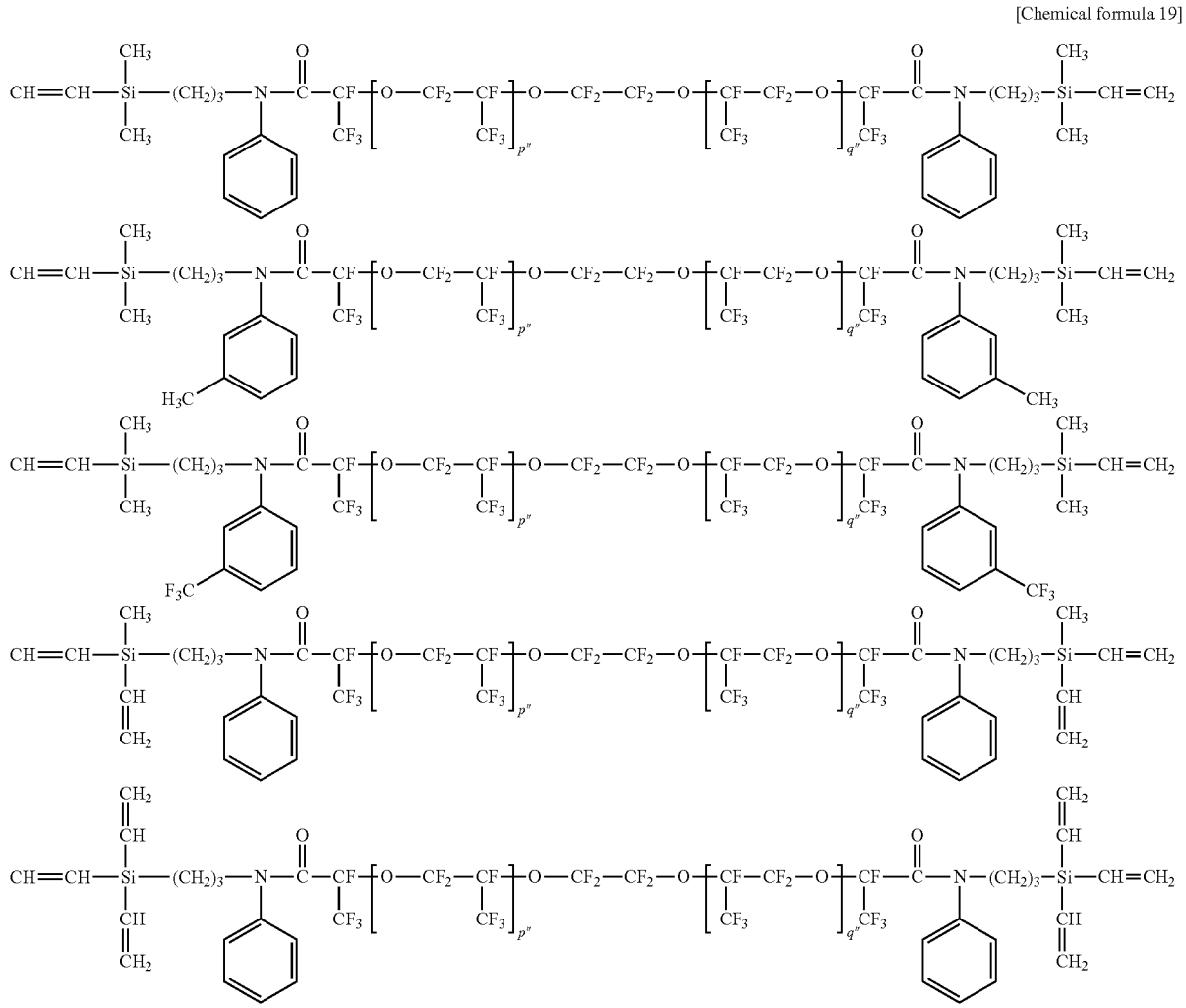

In the above formulas, each of p" and q" represent an integer of 1 to 150, provided that an average of the sum of p" and q" is in the range from 2 to 200.

The amount of alkenyl groups contained in the linear polyfluoro compound represented by formula (1) is preferably from 0.005 to 0.050 mol/100 g, and particularly preferably from 0.007 to 0.040 mol/100 g. If the amount of alkenyl groups contained in the chain polyfluoro compound is too small, then a photo-cured product may decrease its physical strength of or may not be obtained. In contrast, if the amount is too high, then a photo-cured product obtained may be fragile.

The viscosity of the linear polyfluoro compound represented by formula (1) at 23° C. is preferably from 100 to 100,000 mPa·s, and more preferably from 500 to 50,000 mPa·s, and particularly preferably from 1,000 to 20,000 mPa·s. It is preferable that a photo-cured product has an appropriate physical property when a photo-curable composition having the viscosity within this range is applied to, for example, sealing, potting, coating, and impregnating. The it is possible to obtain a compound exhibiting desired viscosity by mixing a low viscosity polymer with a high viscosity polymer.

Further, viscosity (at 23° C.) in the present invention can be measured by a rotating viscometer such as those of BL type, BH type, BS type, cone-plate type, and rheometer. Preferably, the viscosity is measured according to JIS K7117-1. Furthermore, a repetition number (or polymerization degree) of a repeating unit of each perfluorooxyalkylene in a linear perfluoropolyether structure which makes up a backbone of a linear polyfluoro compound can be usually calculated as a number average polymerization degree (or number average molecular weight) in terms of polystyrene by analyzing GPC (Gel Permeation Chromatography) using a fluorine-based solvent as a developing solvent.

Further, in order to adjust the linear polyfluoro compounds represented by formula (1) to a desired number average molecular weight or weight average molecular weight, there can be used a chain extended product as component (A) that is obtained by a usual method with usual conditions through performing hydrosilylation reaction of a linear perfluoropolyether compound with an organosiloxane compound having two hydrosilyl groups (Si—H group) in a molecule.

A single linear polyfluoro compound may be used alone, or in combination with two or more linear polyfluoro compounds.

(B) Fluorine-Containing Organohydrogenpolysiloxane

Component (B) is a fluorine-containing organohydrogenpolysiloxane containing one or more fluorine-containing organic group(s) in a molecule, and preferably 1 to 10 fluorine-containing organic group(s), where at least two, preferably 3 to 50 bonded to silicon-bonded hydrogen atoms (hydrosilyl group represented by Si—H). Component (B) functions as a cross-linking agent and/or a chain extender. Further, it is preferable that component (B) has, in one molecule, at least one fluorine-containing organic group such as monovalent perfluoroalkyl group, monovalent perfluoro-oxyalkyl group, divalent perfluoroalkylene group or divalent perfluoro-oxyalkylene group, in view of compatibility, dispersibility, and post-cure uniformity with component (A).

Examples of the monovalent or divalent fluorine-containing organic groups include groups represented by the formulas shown below such as a perfluoroalkyl group, perfluorooxyalkyl group, perfluoroalkylene group and perfluorooxyalkylene group.

$$C_gF_{2g+1}-$$

$$-C_gF_{2g}- \quad \text{[Chemical formula 20]}$$

In above formulas, g represents an integer of 1 to 20, and preferably an integer 2 to 10.

[Chemical formula 21]

$$\underset{|}{\overset{CF_3}{F(CFCF_2O)_fC_hF_{2h}-}}$$

In above formula, f represents an integer of 1 to 200, preferably of 1 to 100. h represents an integer of 1 to 3.

[Chemical formula 22]

$$-\underset{|}{\overset{CF_3}{CF}}(OCF_2\underset{|}{\overset{CF_3}{CF}})_iOCF_2CF_2O(\underset{|}{\overset{CF_3}{CFCF_2O}})_j\underset{|}{\overset{CF_3}{CF}}-$$

In above formula, each of i and j represents an integer of 1 or more, and preferably an integer 1 to 100 where an average of the sum of i and j is from 2 to 200, and preferably 2 to 100.

$$-(CF_2O)_d-(CF_2CF_2O)_e-CF_2- \quad \text{[Chemical formula 23]}$$

In above formula, each of d and e represents an integer of 1 to 50, preferably of 1 to 40.

Furthermore, it is preferable that silicon atoms in component (B) are bonded by a divalent linking group to the perfluoroalkyl group, perfluoro-oxyalkyl group, perfluoroalkylene group, or perfluoro-oxyalkylene group described above. Examples of the divalent linking groups include alkylene groups, arylene groups, a combination thereof, and groups obtained through intervening these groups with an ether-bonded oxygen atom, amide binding, carbonyl binding, ester binding, and diorganosilylene group, for example. Specific examples thereof include the following divalent linkage groups having 2 to 12 carbon atoms.

—CH$_2$CH$_2$—,

—CH$_2$CH$_2$CH$_2$—,

—CH$_2$CH$_2$CH$_2$OCH$_2$—,

—CH$_2$CH$_2$CH$_2$—NH—CO—,

—CH$_2$CH$_2$CH$_2$—N(Ph)-CO—,

—CH$_2$CH$_2$CH$_2$—N(CH$_3$)—CO—,

—CH$_2$CH$_2$CH$_2$—N(CH$_2$CH$_3$)—CO—,

CH$_2$CH$_2$—Si(CH$_3$)$_2$-Ph'-N(CH$_3$)—CO—,

—CH$_2$CH$_2$CH$_2$—Si(CH$_3$)$_2$-Ph'-N(CH$_3$)—CO—,

—CH$_2$CH$_2$CH$_2$—O—CO—  [Chemical formula 24]

In above formulas, Ph represents a phenyl group, and Ph' represents a phenylene group.

Examples of the monovalent substituted groups bonded to silicon atoms, except for hydrogen atoms bonded to silicon atoms, and the aforementioned monovalent or divalent fluorine-containing organic group, in the fluorine-containing organohydrogenpolysiloxane as component (B) include alkyl groups such as a methyl group, ethyl group, propyl group, butyl group, hexyl group, cyclohexyl group, octyl group, and decyl group; alkenyl groups such as a vinyl group and allyl group; aryl groups such as a phenyl group, tolyl group, and naphthyl group; aralkyl groups such as a benzyl group and phenylethyl group; and unsubstituted or substituted monovalent hydrocarbon groups having 1 to 20, preferably 1 to 12 carbon atoms such as a chloromethyl group, chloropropyl group, and cyanoethyl group, where hydrogen atoms of aforementioned groups are partially or wholly substituted with a chlorine atom, a cyano group or the like.

A fluorine-containing organohydrogenpolysiloxane as component (B) may be any of cyclic, chain, three-dimensional network, or a combination thereof. The number of silicon atoms in the fluorine-containing organohydrogenpolysiloxane is not limited but usually from 2 to 60, preferably from 3 to 30.

Examples of components (B) having such monovalent or divalent fluorine-containing organic group and hydrogen atoms bonded to silicon atoms include the following compounds. These compounds can be used alone or in combination of two or more. In the following formulas, Me represents a methyl group, and Ph represents a phenyl group.

[Chemical formula 25]

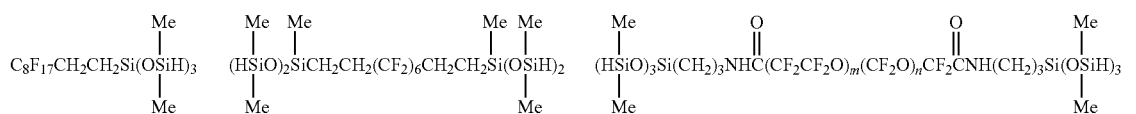

$\overline{m} = 10, \overline{n} = 6$

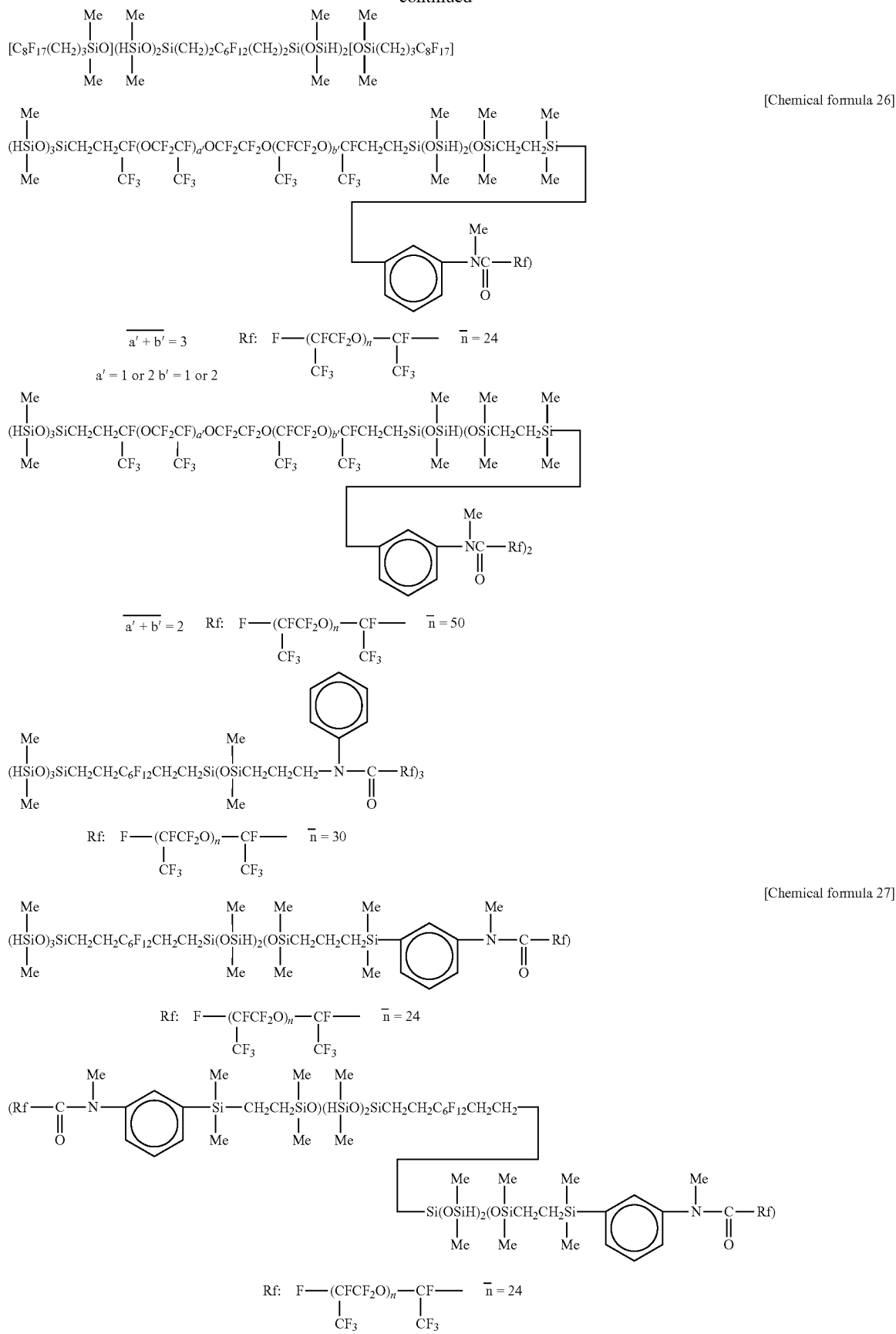

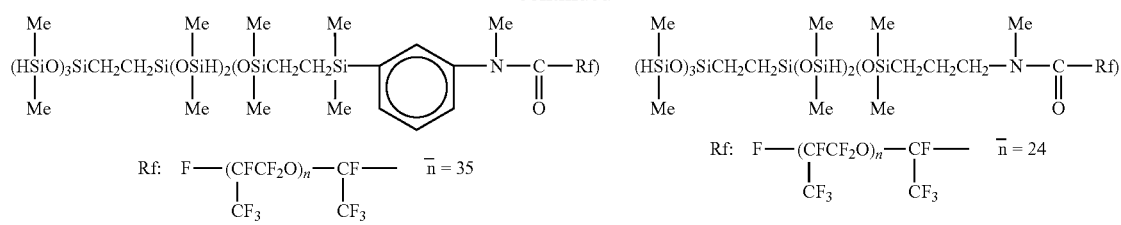
[Chemical formula 28]
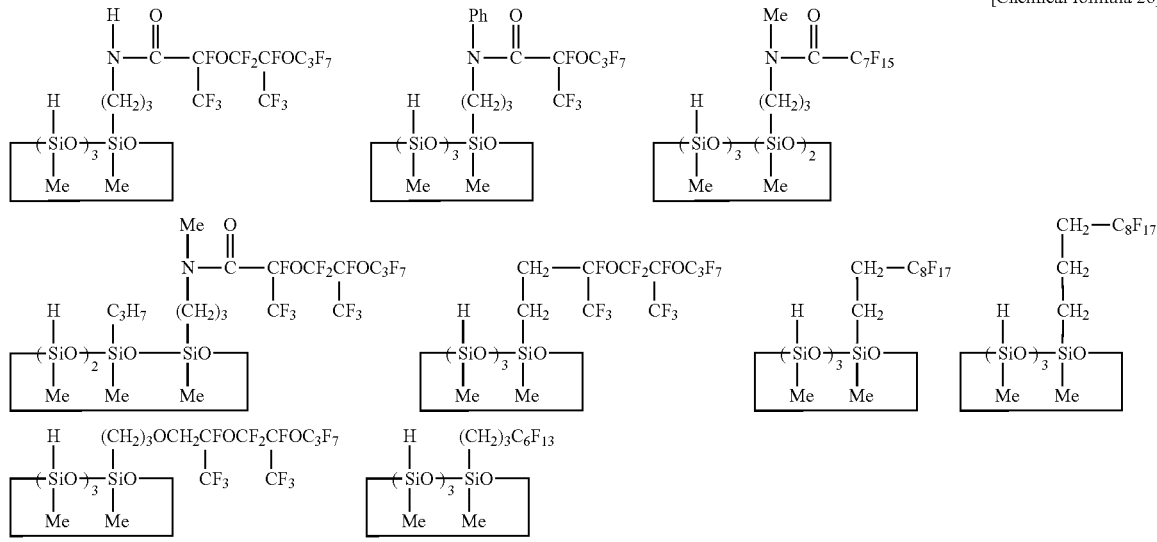
[Chemical formula 29]
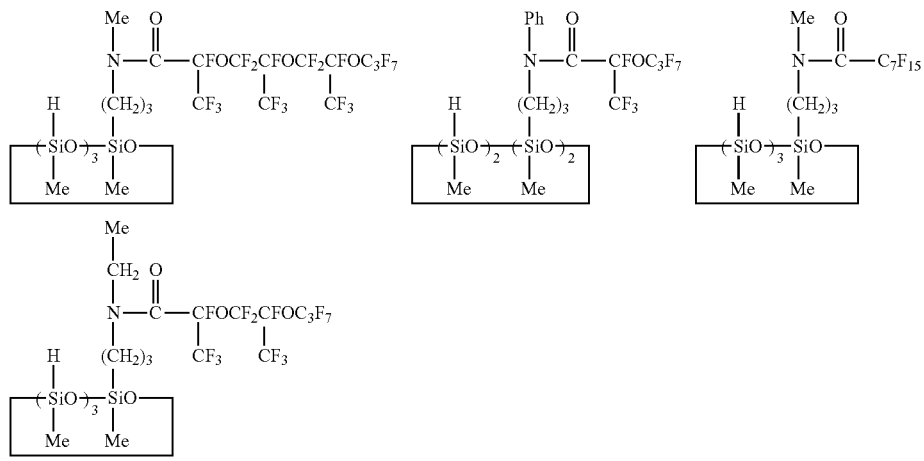
[Chemical formula 30]
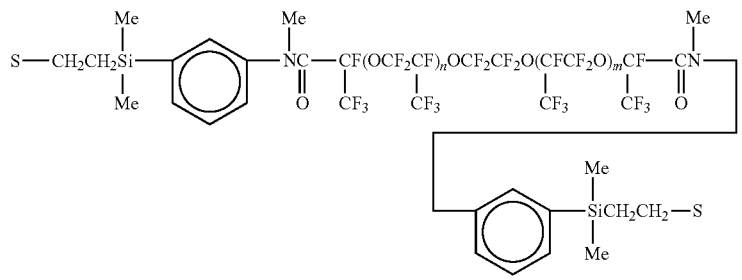
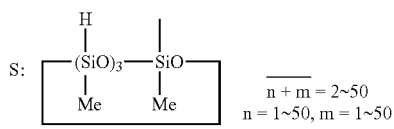

-continued
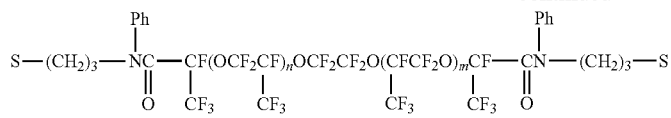
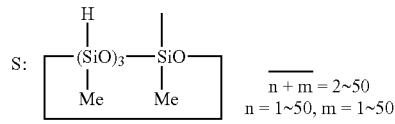
$\overline{n+m} = 2\sim50$
$n = 1\sim50, m = 1\sim50$
[Chemical formula 31]
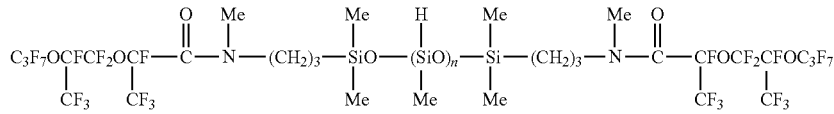
$\overline{n} = 3\sim50$
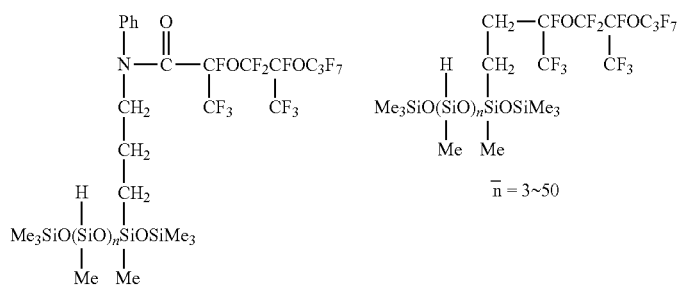
$\overline{n} = 3\sim50$
[Chemical formula 32]
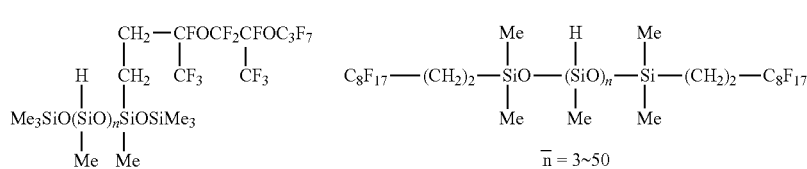
$\overline{n} = 3\sim50$
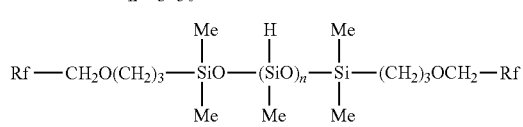
$\overline{n} = 3\sim50$
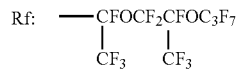
[Chemical formula 33]
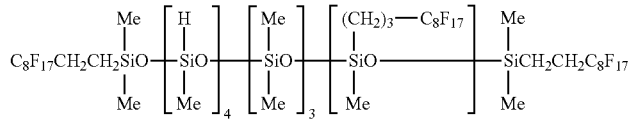
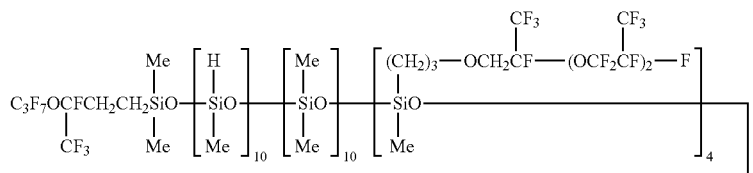
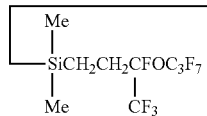

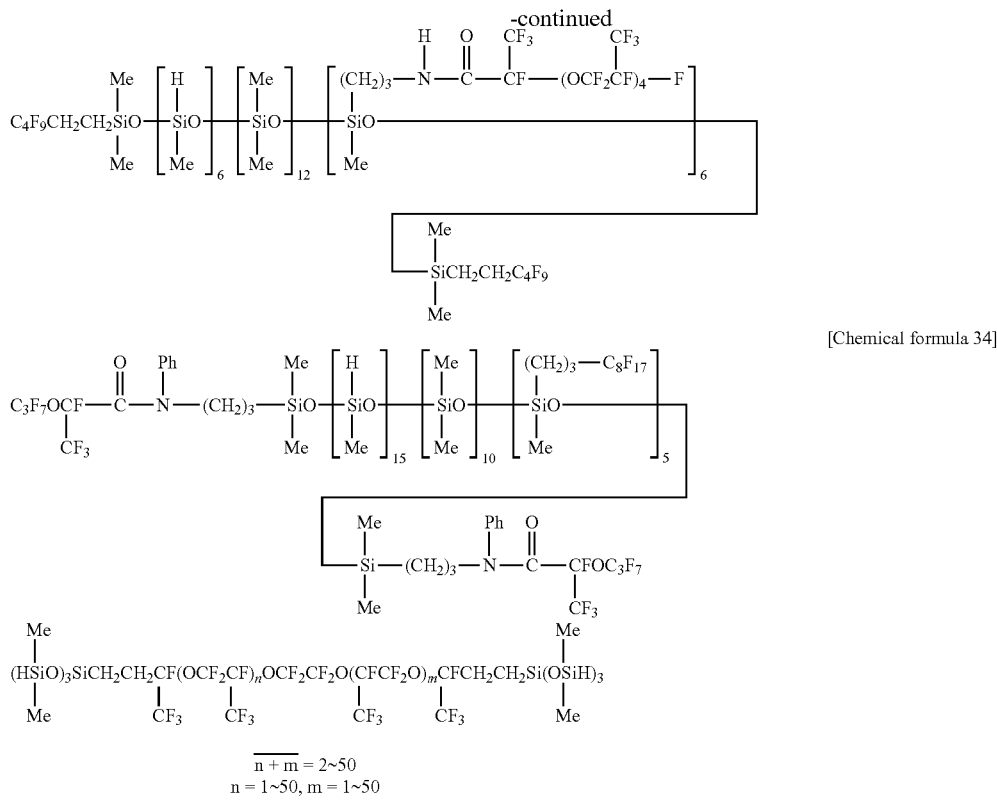

[Chemical formula 34]

$\overline{n+m} = 2\sim 50$
n = 1~50, m = 1~50

The amount of Si—H groups contained in the fluorine-containing organohydrogenpolysiloxane of component (B) is preferably from 0.00050 to 0.01000 mol/g, and more preferably from 0.00100 to 0.00800 mol/g. If the amount of Si—H groups in the component (B) is too small, then a physical property of a photo-cured product obtained may be deteriorated due to the insufficient crosslinking density. In contrast, if the amount is too high, then a photo-curable composition may be bubbled while curing or a physical property of a photo-cured product obtained may be drastically changed with the lapse of time.

These fluorine-containing organohydrogenpolysiloxane can be used alone or in combination of two or more.

Component (B) can be added in an amount such that 0.5 to 3.0 mole, preferably 0.8 to 2.0 mole of hydrosilyl groups (Si—H groups) in the component (B) with respect to one mole of alkenyl groups such as a vinyl group, allyl group, and cycloalkenyl group in component (A). If the amount of hydrosilyl groups (Si—H groups) is too small, then a photo-cured product may not be obtained due to a insufficient crosslinking density. In contrast, if the amount is too high, then a photo-curable composition may be bubbled while curing.

(C) Photoactive Hydrosilylation Catalyst

Component (C) is a photoactive hydrosilylation catalyst. The photoactive hydrosilylation catalyst is activated through irradiation of light, especially ultraviolet light of 300 to 400 nm, which accelerates an addition reaction between alkenyl groups in component (A) and hydrosilyl groups in component (B). As the photoactive hydrosilylation catalyst, platinum-based metal catalysts and nickel-based metal catalysts are mainly available. Examples of the platinum-based metal catalysts include platinum-based metal complex compounds, palladium-based metal complex compounds, and rhodium-based metal complex compounds. Examples of the nickel-based metal catalysts include nickel-based metal complex compounds, iron-based metal complex compounds, and cobalt-based metal complex compounds. Among these metal complex compounds, the platinum-based metal complex compounds are preferable in terms of availability and good catalyst activity.

Examples of the photoactive platinum-based metal complex compounds include ($\eta^5$-cyclopentadienyl)tri($\sigma$-alkyl) platinum complex compounds and β-diketonate platinum complex compounds. Specific examples of the photoactive platinum-based metal complex compounds include a (methylcyclopentadienyl)trimethylplatinum(IV), (cyclopentadienyl)trimethylplatinum(IV), (1,2,3,4,5-pentamethylcyclopentadienyl)trimethylplatinum(IV), (cyclopentadienyl)dimethylethylplatinum(IV), (cyclopentadienyl)dimethylacetylplatinum(IV), (trimethylsilylcyclopentadienyl)trimethylplatinum(IV), (methoxycarbonylcyclopentadienyl)trimethylplatinum(IV), (dimethylphenylsilylcyclopentadienyl)trimethylcyclopentadienylplatinum(IV), trimethyl(acetylacetonate)platinum(IV), trimethyl(3,5-heptanedionate)platinum(IV), trimethyl(methylacetoacetate)platinum(IV), bis(2,4-pentanedionate)platinum(II), bis(2,4-hexanedionate)platinum(II), bis(2,4-heptanedionate)platinum(II), bis(3,5-heptanedionate)platinum(H), bis(1-phenyl-1,3-butanedionate)platinum(II), bis(1,3-diphenyl-1,3-propanedionate)platinum(II), and bis(hexafluoroacetylacetonate)platinum(II).

In the case of using these catalysts, the catalysts may be used in the solid form when they are solid catalysts. However, in order to obtain a more uniformly photo-cured product, these catalysts are preferably solved into an appropriate solvent before compatibilizing the catalysts with a polyfluoro compound as component (A).

Types of solvents used in the present invention are not limited as long as the catalysts are soluble in the solvents. However, in view of achieving uniform dispersion of the catalysts in the photo-curable composition, it is preferable to use a solvent of which hydrogen atoms of hydrocarbon groups are partially substituted with fluorine, or a mixed solvent containing a solvent of which hydrogen atoms of hydrocarbon groups are partially substituted with fluorine and a solvent of which all of hydrogens atoms of hydrocarbon groups are substituted with fluorine.

Examples of the solvent in which hydrogen atoms of hydrocarbon groups are partially substituted with fluorine include 1,3-bis(trifluoromethyl)benzene, 1,2-bis(trifluoromethyl)benzene 1,4-bis(trifluoromethyl)benzene, 1-methyl-3-(pentafluoroethyl)benzene, 1,1,1-trifluoro-3-[3-(trifluoromethyl)phenyl]propane-2-one, methyl 4-fluoro-3-(trifluoromethyl)benzoate, n-butyl heptafluorobutyrate, ethyl 3,5-bis(trifluoromethyl)benzoate, 2-methyl-5-(trifluoromethyl) benzaldehyde, and 2,3-dimethoxybenzotrifluoride.

Examples of the solvent in which all of hydrogen atoms of hydrocarbon groups are substituted with fluorine include octafluorotoluene, (1,1,2,3,3,3-hexafluoropropoxy)perfluorobenzene, pentafluoroethyl 2,2,2-trifluoroethylether, Fluorinert™ (3M), PF5060 (3M), and perfluoropolyether oligomer.

In the case of a solution of a catalyst, a preferable mixture ratio of a polymer of component (A) and the catalyst solution is within the range from 100:0.01 to 100:1.00 (weight ratio). If the additive amount of the catalyst solution exceeds the upper limit of this ratio, a physical property of a photo-cured product may be deteriorated. In contrast, if the additive amount is below the lower limit of this ratio, there may be a risk of insufficient dispersion of catalyst in a photo-curable composition. Thus, a concentration of the catalyst solution should be appropriately adjusted such that the mixture ratio falls within the aforementioned range.

Component (C) is used in amount from 0.1 to 500 ppm, preferably from 1 to 100 ppm based on the mass of component (A) of the present invention in terms of metal atom (especially platinum-group metal atom or nickel-based metal atom). If the amount used of component (C) is too small, the photo-curable composition may not obtain sufficient photo-curability. In contrast, if the usage amount is excessive, there may be a bad influence on the heat resistance of the photo-cured product.

(D) Hydrophobic Silica Powder

The photo-curable fluoropolyether-based rubber composition of the present invention may optionally contain a hydrophobic silica powder as component (D) as long as the advantages of the present invention are not impaired. In this way, a photo-cured product obtained from the photo-curable composition can have an appropriate physical strength. Preferable hydrophobic silica powder is fine silica powder treated with a hydrophobic treatment where the fine silica powder having BET specific surface area of not less than 50 $m^2/g$, preferably 50 to 400 $m^2/g$.

If the BET specific surface area is less than 50 $m^2/g$, an obtained photo-cured product may not have desired physical strength. In contrast, if the BET specific surface area exceeds 400 $m^2/g$, a kneading process may become difficult, thereby drastically decreasing its photo-curability. Examples of fine silica powder include fumed silica (dry silica), precipitated silica (wet silica), and colloidal silica. Among them, fumed silica is most preferable.

Examples of hydrophobic treatment agents for the aforementioned fine silica powder include organochlorosilane, organodisilazane, cyclic organopolysilazane, and linear organopolysiloxane. Among them, organochlorosilane, organodisilazane, and cyclic organopolysilazane are preferable.

The additive amount of component (D) is from 0 to 30 parts by mass, preferably 0.5 to 30 parts by mass, and more preferably from 1 to 25 parts by mass based on 100 parts by mass of component (A) of the present invention. If the additive amount of component (D) is less than 0.5 parts by mass, physical properties of the photo-cured product occasionally cannot be controlled. In contrast, if the additive amount exceeds 30 parts by mass, fluidity of the photo-curable composition may be decreased, and photo-curability thereof may be drastically decreased.

(E) Reaction Control Agent

The photo-curable fluoropolyether based rubber composition of the present invention may further contain well-known reaction control agents for hydrosilylation reaction as component (E) as long as the advantages of the present invention are not impaired. In this way, the photo-curable composition can obtain far better storage stability. Examples of such reaction control agents include acetylene alcohols such as 1-ethynyl-1-hydroxycyclohexane, 3-methyl-1-butyn-3-ol, 3,5-dimethyl-1-hexine-3-ol, 3-methyl-1-pentene-3-ol, and phenylbutynol; acetylene compounds such as 3-methyl-3-penten-1-yne, and 3,5-dimethyl-3-hexene-1-yne. Reaction control agents such as the fluorine-containing acetylene alcohols represented by the following structural formulas, polymethylvinylsiloxane cyclic compounds, and organic phosphate compounds can also be used.

[Chemical formula 35]

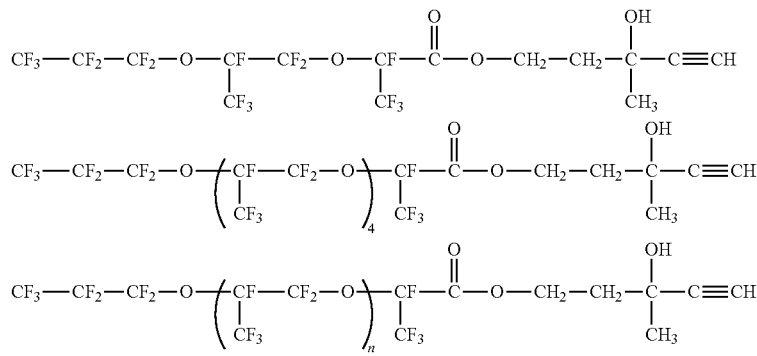

-continued

[Chemical formula 36]
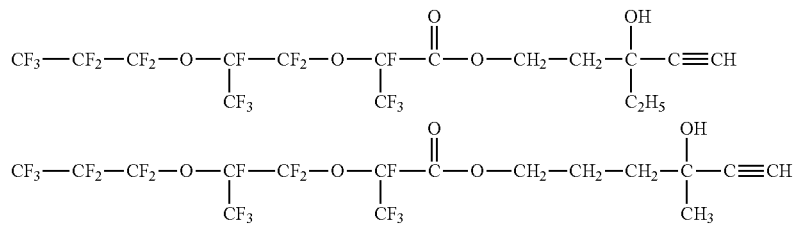

[Chemical formula 37]
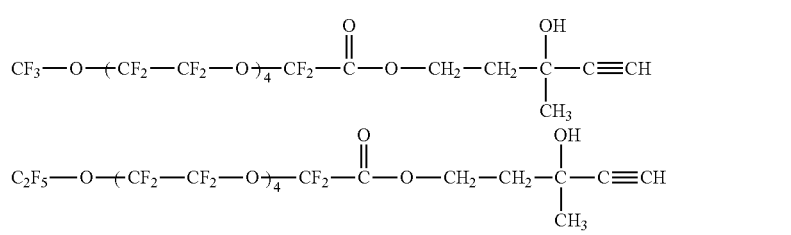

[Chemical formula 38]
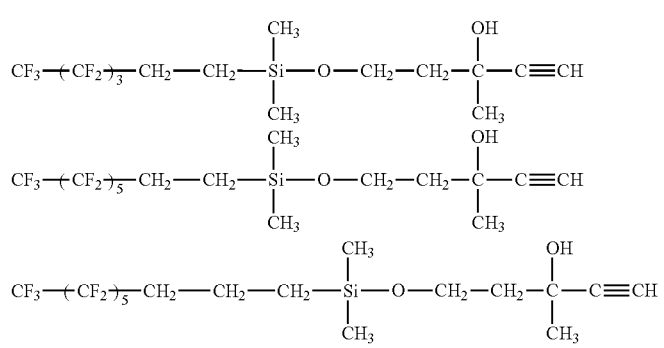

[Chemical formula 39]
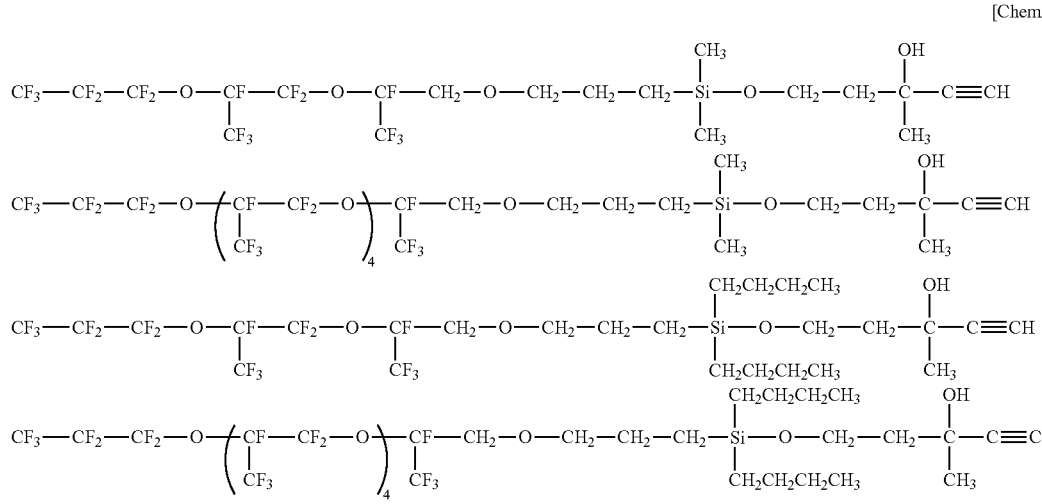

[Chemical formula 40]
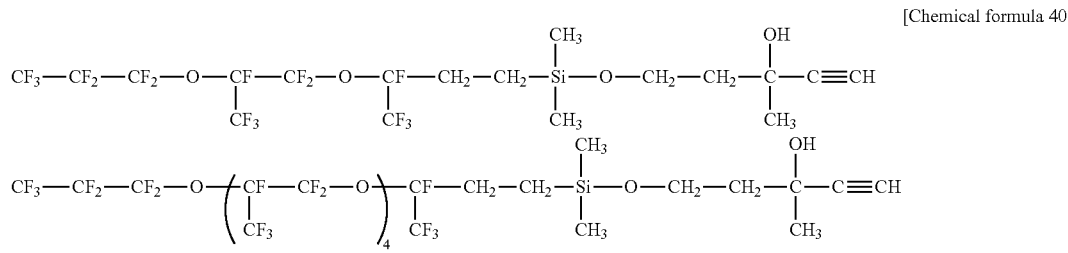

Each of these reaction control agents has its own control ability inherent to its chemical structure. For this reason, additive amount of each of these reaction control agents should be individually optimized. Generally speaking, if the additive amount of the reaction control agent is too small, the photo-curable composition may exhibit poor long-term storage stability at room temperature. In contrast, if the additive amount is too much, curability of the photo-curable composition may be impaired, thus resulting in an insufficient curing.

Other Additive Components

In order to enhance utility for the photo-curable composition of the present invention, there can be added not only components (A) to (E) but also a variety of other additive components such as plasticizers, viscosity control agents, flexibility-imparting agents, inorganic fillers, adhesion promoters, adhesion aids, and silane coupling agents can be added depending on the purpose. The amount of these additive components is not limited as long as the advantages of the present invention and properties of the photo-curable composition and its photo-cured product are not impaired.

A polyfluoromonoalkenyl compound represented by the following formula (3), a linear polyfluoro compound represented by the following formula (4) and/or formula (5), or a combination thereof can be employed as such plasticizers, viscosity control agents, or flexibility-imparting agents.

[Chemical formula 41]

$$Rf^3-(X')_aCH=CH_2 \quad (3)$$

In formula (3), X' is the same definition described above, $Rf^3$ represents the following formula (iii), and a represents an integer of 0 or 1.

[Chemical formula 42]

(iii)

In formula (iii), f1 represents an integer of 1 or more, preferably of 2 to 100, and t represents an integer of 2 or 3, provided that f1 is preferably smaller than any of the sum of p+q (average) and r; and the sum of u and v in the $Rf^1$ group of component (A).

[Chemical formula 43]

$$D-O-(CF_2CF_2CF_2O)_{c1}-D \quad (4)$$

In formula (4), D represents a group represented by formula: $C_sF_{2s+1}-$ (where s denotes any one of 1 to 3), and c1 represents an integer of 1 to 200, preferably of 2 to 100, provided that c1 is preferably smaller than any of the sum of p+q (average) and r; and the sum of u and v in the Rf1 group of component (A).

[Chemical formula 44]

$$D-O-(CF_2O)_{d1}(CF_2CF_2O)_{e1}-D \quad (5)$$

In formula (5), D represents a group represented by formula: $C_sF_{2s+1}-$ (where s denotes any one of 1 to 3), and each of d1 and e1 represent an integer of 1 to 200, preferably of 1 to 100, provided that the sum of d1 and e1 is not larger than the sum of p+q (average) and r, and the sum of u and v in the definition of $Rf^1$ group of the aforementioned component (A).

Examples of such polyfluoromonoalkenyl compounds represented by the formula (3) include the compounds represented by the following formulas (where f1' satisfies the conditions of f1 as shown above).

[Chemical formula 45]

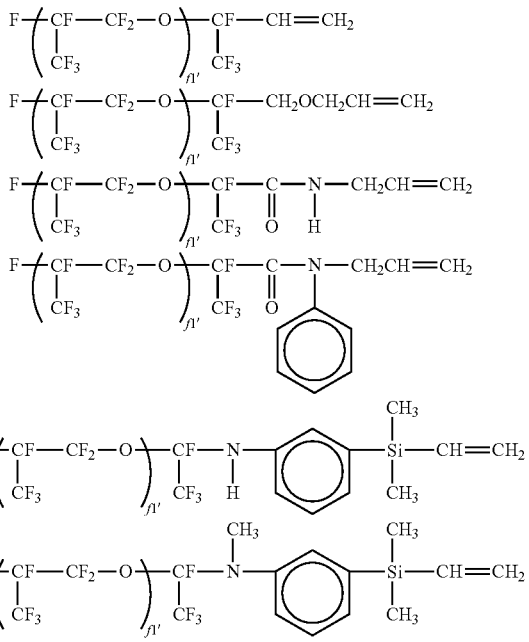

Examples of the linear polyfluoro compounds represented by the formula (4) and formula (5) include the compounds represented by the following formulas (following c1' and the sum of d1' and e1' respectively satisfy the conditions of c1 and the sum of d1 and e1 above).

$$CF_3O-(CF_2CF_2CF_2O)_{c1'}-CF_2CF_3 \quad \text{[Chemical formula 46]}$$

In the above formula, c1' represents an integer of 1 to 200.

$$CF_3-[(OCF_2CF_2)_{e1'}(OCF_2)_{d1'}]-O-CF_3 \quad \text{[Chemical formula 47]}$$

In the above formula, d1' represents an integer of 1 to 200, e1' represents an integer of 1 to 200, and d1'+e1' is equal to an integer of 2 to 200.

The additive amount of the compounds represented by the formula (3) to formula (5) is 1 to 300 parts by mass, preferably 50 to 250 parts by mass based on 100 parts by mass of component (A), especially the linear polyfluoro compound of the formula (1) in the photo-curable composition of the present invention. It is preferable that viscosity (23° C.) measured by a rotating viscometer is from 5 to 100,000 mPa·s because of the same reason as the linear polyfluoro compound.

Examples of the inorganic fillers include reinforced or semi-reinforced fillers such as quarts powder, molten quarts powder, diatom earth, and calcium carbonate; inorganic pigments such as iron oxide, carbon black, and cobalt aluminum oxide; heat resistance improvers such as titanium oxide, iron oxide, carbon black, cerium oxide, cerium hydroxide, zinc carbonate, magnesium carbonate, and manganese carbonate; thermal conductivity-imparting agents such as alumina, boron nitride, silicon carbide, and metal powder; and electrical conductivity-imparting agents such as carbon black, silver powder, and electro-conductive zinc oxide.

Adhesion aids, silane coupling agents, and/or adhesion promoters such as carboxylic acid anhydride and titanate ester can be added thereto depending on the purpose of the present invention.

Photo-Curable Fluoropolyether-Based Rubber Composition

The photo-curable fluoropolyether-based rubber composition of the present invention can be produced by uniformly mixing the aforementioned components (A) to (C), preferably components (A) to (D), more preferably components (A) to (E), and any of other additive components, using a mixing apparatus such as planetary mixer, Ross mixer, and Hobart mixer, and if desired, a kneading apparatus such as kneader and triple-roller mill.

A method for producing the photo-curable fluoropolyether-based rubber composition of the present invention is not limited, thus the aforementioned components can be kneaded to produce the composition of the present invention. Further, two kinds of the photo-curable fluoropolyether-based rubber composition are prepared, and then these two may be mixed when used.

The following is one of the methods for producing the photo-curable fluoropolyether-based rubber composition in the case of mixing components (A) to (E). In the case of producing the photo-curable composition from components (A) to (C), components (A) to (C) are simple added in order and then mixed.

In the case of producing the photo-curable composition from components (A) to (E), for example, the following method is available. That is, to whole or part of component (A) is added 10 to 50 parts by mass of component (D) based on 100 parts by mass of whole or part of component (A) under heat or non-heat conditions. These component (A) and component (D) are then kneaded under conditions of heat and reduced pressure or under conditions of heat and pressure. The mixture is then diluted with the rest of component (A) (post-dilution) so as to make the mixture having a given composition ratio for the last time. In this way, photo-curability of the photo-curable fluoropolyether-based rubber composition can be improved.

Here, kneading of whole or part of component (A) and component (D) is performed to sufficiently cover the surfaces of hydrophobic silica powders as component (D) with the linear polyfluoro compound as component (A). In this way, component (B) gets less likely to be absorbed on the surface of component (D), and component (B) and component (D) get less likely to be aggregated, thereby decreasing the viscosity of the photo-curable fluoropolyether-based rubber composition, thus improving the photo-curability thereof. Whole or part of component (A) and component (D) can be fed and then kneaded using any knead apparatus or the like such as a planetary mixer, a gate mixer, or a kneader Temperature and time during feeding and kneading can be appropriately decided. However, it is preferable that the heat treatment temperature is from 120 to 180° C., and that kneading time is 1 hour or more so as to uniformly disperse the components.

Pressure applied during feeding and kneading operation depends on the apparatus employed. For this reason, the pressure condition, either reduced or increased, is appropriately selected in accordance with the apparatus employed. When kneaded with a planetary mixer or gate mixer for example, a condition of reduced pressure of −0.05 MPa or less, in terms of gauge pressure, is preferable. When kneaded with a kneader, a condition of increased pressure of 0.4 to 0.6 MPa, in terms of gauge pressure, is preferable. The kneading operation under these conditions causes component (A) to easily get wet to (cover) the surface of component (D).

The resultant liquid base consisting of whole or part of component (A) and component (D) is mixed with the rest of component (A), component (B), component (C), and component (E), thereby obtaining a photo-curable fluoropolyether-based rubber composition.

When using the photo-curable fluoropolyether-based rubber composition of the present invention, the composition may be used by dissolving the composition in any appropriate fluorochemical solvents such as 1,3-bis(trifluoromethyl)benzene, Fluorinert™ (3M), perfluorobutylmethylether, perfluorobutylethylether, perfluoropolyether oligomer, and combinations thereof at a desired concentration depending on the usage and purpose. Usage of a solvent is particularly preferable in a case of thin layer coating.

Method for Photo-Curing a Photo-Curable Fluoropolyether-Based Rubber Composition The resultant photo-curable fluoropolyether-based rubber composition can be cured through light irradiation. The irradiated light has an emission spectrum having a maximum peak in the wavelength region from 300 nm to 400 nm. Moreover, the spectral irradiance for the light within the wavelength region shorter than 300 nm is not more than 5%, preferably not more than 1%, and more preferably not more than 0.1%, of the spectral irradiance of the light having maximum peak wavelength. In short, the spectral irradiance for light within the wavelength region shorter than 300 nm is preferably as close to 0 as possible. If the light, having wavelength shorter than 300 nm and spectral irradiance greater than 5% of the aforementioned spectrum irradiance for the maximum peak wavelength, is irradiated thereon, terminal groups of a polymer may be decomposed or a portion of a photoactive catalyst may be decomposed, thereby not obtaining a sufficient cured product.

Although there are no particular limitations on the type of photoactive light for the irradiation, ultraviolet light, especially a near-ultraviolet radiation whose maximum peak is in the wavelength region from 300 nm to 400 nm, is preferred. The dose (intensity) of ultraviolet light irradiation for achieving good photo-curability, in term of accumulated irradiance, is from 100 to 100,000 mJ/cm$^2$, preferably 1,000 to 10,000 mJ/cm$^2$, and more preferably 5,000 to 10,000 mJ/cm$^2$. If the dose of ultraviolet light is less than the lower limit of the aforementioned range, a sufficient photo-cured product may not be obtained because there lacks a sufficient energy for activating the photoactive hydrosilylation catalyst in the photo-curable composition. In contrast, if the dose of ultraviolet light is more than the upper limit of this range, terminal groups of a polymer may be decomposed or a portion of a photoactive catalyst may be decomposed because excessive amount of irradiation energy is delivered to the photo-curable composition, thereby not obtaining a sufficient cured product.

The irradiated ultraviolet light may be light having a plurality of emission spectra or a single emission spectrum. Further, the single emission spectrum may be in a broad spectrum from 300 to 400 nm, or the single emission spectrum may have a peak (namely, a maximum peak wavelength) from 300 to 400 nm, and preferably from 350 to 380 nm. Examples of light sources emitting such light include ultraviolet light emitting semiconductor light sources, such as an ultraviolet light emitting diode (UV-LED) and an ultraviolet light emitting semiconductor laser.

Examples of light sources emitting light having a plurality of emission spectra include lamps such as a metal halide lamp, xenon lamp, carbon-arc lamp, chemical lamp, sodium lamp, low-pressure mercury lamp, high-pressure mercury lamp and ultra-high-pressure mercury lamp; gas lasers such as a nitrogen gas laser, liquid lasers using organic dye solutions, and solid-state lasers using an inorganic single crystal containing a rare-earth ion.

Light having wavelengths shorter than 300 nm is removed by an optical filter if the emission spectrum of the light has a peak in the wavelength region of less than 300 nm or a wavelength having greater than 5% of the spectral irradiance of the maximum peak wavelength of the emission spectrum exists in the wavelength region of less than 300 nm (for example, where the emission spectrum is very broad in a wide wavelength region). In this way, the spectral irradiance at any wavelength within the wavelength region shorter than 300 nm that is set to be not more than 5%, preferably not more than 1%, more preferably not more than 0.1%, and most preferably 0%, of the spectral irradiance at the maximum peak wavelength. If a plurality of peaks exist in the emission spectrum within the wavelength region from 300 to 400 nm, the peak wavelength that exhibits the largest irradiance is deemed to be the maximum peak wavelength. There are no particular limitations on the optical filter, provided that it is capable of cutting out wavelengths shorter than 300 nm, and conventional filters may be used. For example, a 365 nm bandpass filter or the like may be used. The irradiance and spectral distribution of ultraviolet light can be measured using a spectroradiometer such as a USR-45D device (manufactured by Ushio Inc.).

There are no particular limitations on a light irradiation apparatus, and the light irradiation apparatus such as a spot irradiation type apparatus, surface-emitting type apparatus, line-emitting type apparatus, and conveyor-emitting type apparatus may be available.

When curing the thus obtained photo-curable fluoropolyether-based rubber composition of the present invention, light irradiation time is, for example, 1 to 300 seconds, preferably 10 to 200 seconds, and more preferably 30 to 150 seconds. The photo-curable composition loses its fluidity after 1 to 60 minutes, especially 5 to 30 minutes from light irradiation, thereby obtaining a rubber elastic body (rubber cured product).

Photo-Curable Fluoropolyether-Based Rubber Cured Product

A photo-curable fluoropolyether-based rubber composition of the present invention having, as main components, the aforementioned component (A) to component (C), preferably component (A) to component (D), and more preferably component (A) to component (E) can form a rubber cured product by using the aforementioned photo-curing method, and thereby the thus rubber cured product have excellent chemical resistance and solvent resistance, and low moisture permeability. The formation of the rubber cured product can be easily performed by conventional methods, for example, in which the photo-curable composition of the present invention is poured into an appropriate container or is coated onto a substrate, and then is cured by light irradiation.

A photo-curable fluoropolyether-based rubber composition of the present invention can be suitably used as a member for various applications such as an automobile, chemical plant, semiconductor manufacturing line, analytical or scientific instrument, medical equipment, fuel cell, inkjet printer, aircraft, and organic EL panel.

More details about the applications of a photo-curable fluoropolyether-based rubber composition of the present invention are included below. Examples of rubber components for automobile include diaphragms, valves, sealing materials, and the like. Examples of rubber compositions for chemical plant, especially for a pump, include diaphragms, valves, hoses, packings, oil seals, gaskets, sealing materials such as a repair sealing material for tank piping. Examples of rubber compositions for semiconductor manufacturing line include valves in which low friction and wear resistant are required, and sealing materials, especially for instruments contacting to chemicals, such as a diaphragm, valve, packing, and gasket. Examples of rubber compositions for analytical or scientific instrument include, especially for pump, diaphragms, valves, and sealing materials (such as a packing). Examples of rubber compositions for medical equipment include pumps, valves, and joints. Examples of rubber compositions for fuel cell include sealing materials. Examples of rubber compositions for inkjet printer, aircraft, organic EL panel, and the others include film materials for tent, sealants, molded components, extruded components, coating materials, roll materials for copying machine, moisture-proof coating materials for electricity, potting materials for sensor, sealing materials for machine tool, and laminated rubber clothes.

EXAMPLES

Detailed description of the present invention is described with reference to a series of examples and comparative examples. However, the present invention shall not be limited to these examples. Hereunder, Me represents a methyl group, and the term "parts" refers to parts by mass in the following examples. Also, viscosity refers to a measured value measured at 23° C. according to JIS K7117-1. Molecular weight refers to number average molecular weight in terms of polystyrene when performing GPC (Gel Permeation Chromatography) analysis using a fluorine-based solvent as a developing solvent.

Preparation of Base Compound for Photo-Curable Fluoropolyether-Based Rubber Composition Product Example To a planetary mixer were separately fed: 100 parts of a polymer as represented by formula (6), having a viscosity of 9,000 mPa·s, vinyl group content of 0.013 mol/100 g, and number average molecular weight of 15,700; and 10 parts of fumed silica (product name: AEROSIL R972, by Nippon Aerosil Co., Ltd.) as a hydrophobic silica-based filler. The mixture was then kneaded by the mixer for 1 hour. The mixture was heat-treated for 1 hour at 150° C. while mixing and keeping a low pressure of from −0.08 to −0.10 MPa. After cooling the mixture, the mixture was dispersion-treated using a three-roll mill to obtain a base compound.

[Chemical formula 48]

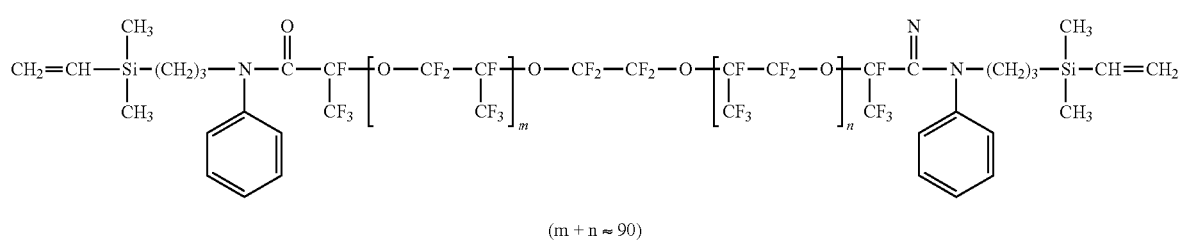

(6)

(m + n ≈ 90)

Preparation of Photo-Curable Fluoropolyether-Based Rubber Composition

Example 1

To a planetary mixer was fed 100 parts of polymer as represented by formula (6). To this mixture was then fed 0.07 parts of a 1,3-bis(trifluoromethyl)benzene solution of (trimethyl)methylcyclopentadienylplatinum(IV) (platinum concentration: 3.0 mass %), followed by an addition of 2.4 parts of a fluorine-containing organohydrogenpolysiloxane of the following formula (7) (amount of Si—H group: 0.00500 mol/g). These components were uniformly mixed and then defoamed to prepare a photo-curable fluoropolyether-based rubber composition.

[Chemical formula 49]

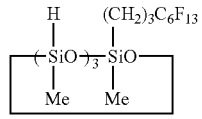
(7)

Example 2

To a planetary mixer were fed 110 parts of the base compound prepared in the Product Example and 100 parts of a polymer of the following formula (6). These components were uniformly mixed. Further, to the mixture were sequentially added 0.14 parts of a 1,3-bis(trifluoromethyl)benzene solution of a (trimethyl)methylcyclopentadienylplatinum (IV) (platinum concentration: 3.0 mass %), 0.11 parts of a toluene solution of 1-ethynyl-1-hydroxycyclohexane (5.0 mass %), and 5.0 parts of a fluorine-containing organohydrogenpolysiloxane of the following formula (7) (amount of Si—H group: 0.00500 mol/g). These components were uniformly mixed and then defoamed to prepare a photo-curable fluoropolyether-based rubber composition.

Example 3

With the exception of using 0.88 parts of a 2-(2-butoxyethoxy)ethyl acetate solution of a bis(2,4-heptanedionate) platinum (II) (platinum concentration: 0.5 mass %) instead of 0.14 parts of the 1,3-bis(trifluoromethyl)benzene solution of a (trimethyl)methylcyclopentadienylplatinum(IV) (platinum concentration: 3.0 mass %) as a photoactive hydrosilylation catalyst used in Example 2, a photo-curable fluoropolyether-based rubber composition was prepared in the same manner as Example 2.

Example 4

With the exception of using 5.0 parts of a fluorine-containing organohydrogenpolysiloxane of the following formula (8) instead of 5.0 parts of the fluorine-containing organohydrogenpolysiloxane of the following formula (7) used in Example 2, a photo-curable fluoropolyether-based rubber composition was prepared in the same manner as Example 2.

[Chemical formula 50]

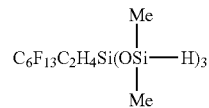
(8)

Comparative Example 1

With the exception of using 0.14 parts of an ethanol solution of a platinum-divinyltetramethyldisiloxane complex (platinum concentration: 3.0 mass %) as a non-photoactive hydrosilylation catalyst instead of 0.14 parts of the 1,3-bis(trifluoromethyl)benzene solution of a (trimethyl)methylcyclopentadienylplatinum(IV) (platinum concentration: 3.0 mass %) as a photoactive hydrosilylation catalyst used in Example 4, a curable fluoropolyether-based rubber composition was prepared in the same manner as Example 4.

Evaluation of Storage Stability

As to the curable fluoropolyether-based rubber compositions of Examples and Comparative Example, initial viscosities were compared with viscosities where the compositions were left for two weeks while shielding light at 23° C. The results are as shown in Table 1. Additionally, viscosity measurement was according to JIS K7117-1 by using a TV-IOU type rotating viscometer (Rod No. H6, 23° C., 100 rpm) produced by Toki Sangyo Co., Ltd.

Evaluation of Photo-Curability

The photo-curable fluoropolyether-based rubber compositions obtained in Examples 1 to 4 were cast into a mold having a size of (H)×(D)×(t)=105 mm×85 mm×2 mm and were irradiated with light from an EYE UV electronic control device equipped with a uniform irradiation optical unit (manufactured by Iwasaki Electric Co., Ltd.) while cutting out light having wavelengths of less than 300 nm by using a 365 nm bandpass filter. The irradiation of light was performed at 100 mW/cm² for 90 seconds such that an accumulated light amount of a main light whose wavelength 365 nm was 9,000 mJ/cm². Immediately after finishing the irradiation, the compositions were shielded from the light, and rubber properties thereof after 30 minutes, one hour, and two hours from shielding the light were measured according to JIS K6250, 6251, and 6253 while placing at 23° C. The results are as shown in Table 2. Further, Reference Example 1 had the same components and was allowed to perform the same operations as Example 1 except for not using the 365 nm bandpass filter while irradiating the compound with ultraviolet light. The result is as shown in Table 2.

TABLE 1

|  | Example 1 | Example 2 | Example 3 | Example 4 | Comparative Example 1 |
|---|---|---|---|---|---|
| Base Compound | — | 110 | 110 | 110 | 110 |
| Linear Polyfluoro Compound (6) | 100 | 100 | 100 | 100 | 100 |
| Fluorine-containing Organohydrogensiloxane (7) | 2.4 | 5.0 | 5.0 | — | — |
| Si—H/Vinyl (molar ratio) | 1.0 | 1.0 | 1.0 | — | — |

TABLE 1-continued

|  | Example 1 | Example 2 | Example 3 | Example 4 | Comparative Example 1 |
|---|---|---|---|---|---|
| Fluorine-containing Organohydrogensiloxane (8) | — | — | — | 5.0 | 5.0 |
| Si—H/Vinyl (molar ratio) | — | — | — | 1.0 | 1.0 |
| Photoactive Hydrosilylation Catalyst (Trimethyl)MethylcyclopentadienylPlatinum (IV) Solution | 0.07 | 0.14 | — | 0.14 | — |
| Photoactive Hydrosilylation Catalyst Bis(2,4-Heptanedionato)Platinum (II) Solution | — | — | 0.88 | — | — |
| Platinum-Divinyltetramethyldisiloxane Complex Solution | — | — | — | — | 0.14 |
| Reaction Control Agent 1-Ethynyl-1-Hydroxycyclohexane Solution | — | 0.11 | 0.11 | 0.11 | 0.11 |
| Initial Viscosity (Pa · s) | 10 | 20 | 30 | 21 | Cured Immediately After Mixing |
| Viscosity (2 weeks later, 23° C.) (Pa · s) | 13 | 20 | 35 | 22 | — |

TABLE 2

|  | Example 1 | | | Example 2 | | | Example 3 | | | Example 4 | | | Reference Example 1 |
|---|---|---|---|---|---|---|---|---|---|---|---|---|---|
| 365 nm bandpass filter | Used | | | Used | | | Used | | | Used | | | Not-used |
| Lapse Time After Irradiation (hr) | 0.5 | 1 | 2 | 0.5 | 1 | 2 | 0.5 | 1 | 2 | 0.5 | 1 | 2 | 0.5 |
| Hardness (Type A Durometer) | 30 | 31 | 31 | 40 | 40 | 42 | 35 | 40 | 42 | 39 | 39 | 40 | Yellowing |
| Tensile Strength (MPa) | 0.7 | 0.7 | 0.8 | 2.0 | 2.3 | 2.2 | 2.5 | 2.5 | 2.0 | 2.0 | 2.1 | 2.2 | Insufficient |
| Breaking Elongation (%) | 190 | 180 | 200 | 320 | 350 | 330 | 390 | 380 | 350 | 310 | 320 | 330 | Curing |

As seen from the results in Table 1, the photo-curable fluoropolyether-based rubber compositions of the present invention show good storage stability in a light-shielding condition.

As seen from the results in Table 2, the photo-curable fluoropolyether-based rubber compositions (Examples 1 to 4) show superior curability through irradiating the compositions with light whose wavelengths from less than 300 nm were cut out. The Reference Example 1, without using 365 nm bandpass filter, shows a poor cured product because the outermost surface irradiated with the light was yellowed, showing an existence of an uncured part.

Heat-Resistance Evaluation of Photo-Cured Products

A heat-resistance evaluation was conducted on the obtained compositions in Examples 1 to 4 at 150° C. according to JIS K6257. The results are as shown in Table 3.

TABLE 3

| Evaluated Properties | Heat-Resistant Condition | Example 1 | Example 2 | Example 3 | Example 4 |
|---|---|---|---|---|---|
| Hardness (Duro-A) | Initial Stage | 31 | 42 | 42 | 40 |
|  | 150° C., 72 hr | 32 | 42 | 42 | 41 |
|  | 150° C., 168 hr | 33 | 44 | 43 | 41 |
| Tensile Strength (MPa) | Initial Stage | 0.8 | 2.2 | 2.0 | 2.2 |
|  | 150° C., 72 hr | 1.0 | 2.3 | 2.0 | 2.6 |
|  | 150° C., 168 hr | 1.2 | 2.6 | 2.3 | 2.6 |
| Breaking Elongation (%) | Initial Stage | 200 | 330 | 350 | 330 |
|  | 150° C., 72 hr | 160 | 240 | 210 | 290 |
|  | 150° C., 168 hr | 180 | 270 | 220 | 290 |

As seen from the results in Table 3, the photo-cured products of the present invention have rubber properties whose changes were small at heat-resistance evaluation at 150° C., showing photo-cured products having satisfied rubber properties at room temperature and having excellent heat-resistance.

Low-Temperature Performance Evaluation of Photo-Cured Products

Using a differential scanning calorimeter (DSC), the glass transition temperature (Tg) of the photo-cured products obtained from the compositions of Examples 1 to 4 were analyzed. The glass transition temperature (Tg) was found to be Tg=−54° C. This result shows that the cured products obtained from the compositions of Examples have excellent low-temperature performance.

Solvent-Resistance Evaluation of Photo-Cured Products

The cured product obtained from the composition of Example 2 was examined by an immersion test in various organic solvents according to JIS K6258 in order to measure a volume change ratio and thereby to evaluate solvent swell resistance. The results are as shown in Table 4.

TABLE 4

| Solvent | Volume Change Ratio (%) |
|---|---|
| Fuel C | 10 |
| Hexane | 10 |
| Toluene | 7 |
| Chloroform | 12 |
| MEK | 8 |
| Ethyl acetate | 9 |
| Methanol | 2 |
| Ethylene glycol | 1 |
| THF | 11 |

As seen from the results in Table 4, the photo-cured product obtained from the composition of Example 2 has superior solvent swell resistance. Also, similar results were found for the photo-cured products obtained from the compositions of Examples 3 and 4 as the photo-cured product of Example 2 in the same evaluation, showing superior solvent swell resistance for each photo-cured product of the present invention.

What is claimed is:

1. A method for producing a cured product by irradiating a light to a photo-curable fluoropolyether-based rubber composition to cure the composition, the composition comprising:
    (A) 100 parts by mass of a linear polyfluoro compound having: at least two alkenyl groups per molecule; and a linear perfluoropolyether structure in a backbone of the molecule,
    (B) a fluorine-containing organohydrogenpolysiloxane having at least two hydrogens bonded to a silicon atom per molecule, said fluorine-containing organohydrogenpolysiloxane containing 0.5 to 3.0 mol of Si—H groups based on 1.0 mol of alkenyl groups in component (A); and
    (C) 0.1 to 500 ppm of a photoactive hydrosililation catalyst based on the mass of component (A) in terms of metal atom,
    wherein the photoactive hydrosililation catalyst of component (C) is ($\eta^5$-cyclopentadienyl)tri($\sigma$-alkyl) platinum (IV) complex compound and/or β-diketonate platinum (II) complex compound, and
    the light has an emission spectrum having a maximum peak wavelength in a region from 300 nm to 400 nm, and a spectral irradiance of the light in any wavelengths shorter than 300 nm is not more than 5% with respect to the spectral irradiance of the light of the maximum peak wavelength.

2. The method for producing the cured product according to claim 1, wherein component (A) is a linear polyfluoro compound represented by a formula (1):

$$CH_2=CH-(X)_g-Rf^1-(X')_g-CH=CH_2 \quad (1)$$

wherein X represents —$CH_2$—, —$CH_2O$—, —$CH_2OCH_2$—, or —Y—$NR^1$—CO—, wherein Y represents —$CH_2$—, —$Si(CH_3)_2CH_2CH_2CH_2$—, —$Si(CH_3)(CH=CH_2)CH_2CH_2CH_2$—, —$Si(CH=CH_2)_2CH_2CH_2CH_2$—, or an o-, m-, or p-silylphenylene group represented by a structural formula (Z) shown below,

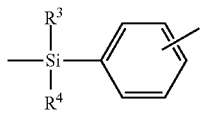
(Z)

wherein each of $R^3$ and $R^4$ independently represents —$CH_3$ or —$CH=CH_2$,
and $R^1$ represents a hydrogen atom or a substituted or unsubstituted monovalent hydrocarbon group, X' represents —$CH_2$—, —$OCH_2$—, —$CH_2OCH_2$—, or —CO—$NR^2$—Y'—, wherein Y' represents —$CH_2$—, —$CH_2CH_2CH_2Si(CH_3)_2$—, —$CH_2CH_2CH_2Si(CH_3)(CH=CH_2)$—, —$CH_2CH_2CH_2Si(CH=CH_2)_2$—, or an o-, m-, or p-silylphenylene group represented by a structural formula (Z') shown below

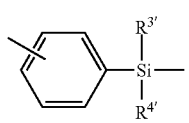
(Z')

wherein each of $R^{3'}$ and $R^{4'}$ independently represents —$CH_3$ or —$CH=CH_2$, and $R^2$ represents a hydrogen atom or a substituted or unsubstituted monovalent hydrocarbon group, g independently represents an integer of 0 or 1, and $Rf^1$ is a linear divalent perfluoropolyether group represented by a formula (i) or formula (ii) shown below,

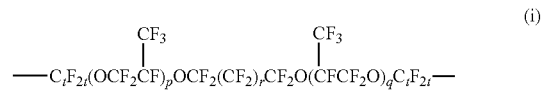

wherein each of p and q representing an integer of 0 to 150, provided that an average of the sum of p and q is from 2 to 200, r representing an integer of 0 to 6, and t representing an integer of 2 or 3,

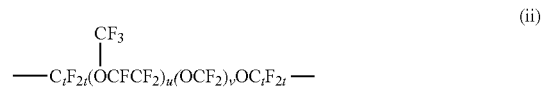

wherein u representing an integer of 1 to 200, v representing an integer of 1 to 50, and t representing an integer of 2 or 3.

3. The method for producing the cured product according to claim 1, wherein the fluorine-containing organohydrogenpolysiloxane of component (B) has at least one monovalent perfluoroalkyl group, monovalent perfluorooxyalkyl group, divalent perfluoroalkylene group, or divalent perfluorooxyalkylene group per molecule.

4. The method for producing the cured product according to claim 1, the composition further comprising (D) 0.5 to 30 parts by mass of hydrophobic silica powder having BET specific surface area of not less than 50 m²/g based on 100 parts by mass of component (A), as a filler.

5. The method for producing the cured product according to claim 1, the composition further comprising (E) a reaction control agent for hydrosilylation reaction.

6. A method for producing a cured product, said method including the steps of:
    providing a composition comprising:
    (A) 100 parts by mass of a linear polyfluoro compound having: at least two alkenyl groups per molecule; and a linear perfluoropolyether structure in a backbone of the molecule;
    (B) a fluorine-containing organohydrogenpolysiloxane having at least two hydrogens bonded to a silicon atom per molecule, said fluorine-containing organohydrogenpolysiloxane containing 0.5 to 3.0 mol of Si—H groups based on 1.0 mol of alkenyl groups in component (A); and
    (C) 0.1 to 500 ppm of a photoactive hydrosililation catalyst based on the mass of component (A) in terms of metal atom, said catalyst being selected from the group consisting of ($\eta^5$-cyclopentadienyl)tri($\sigma$-alkyl) platinum (IV) complex compound, β-diketonate platinum (II) complex compound, and mixtures thereof; and
    irradiating said composition with light having an emission spectrum with a maximum peak wavelength in a region from 300 nm to 400 nm and a spectral irradiance in any wavelengths shorter than 300 nm of not more than 5% with respect to the spectral irradiance of the light of the maximum peak wavelength.

7. The method of claim 6, wherein the intensity of said irradiation is in the range from 100 to 100,000 mJ/cm².

8. The method of claim 6, wherein the duration of said irradiation is in the range from 1 to 300 seconds.

* * * * *